May 28, 1929.  P. LIEBERKNECHT  1,715,338
THREAD GUIDE OPERATING DEVICE FOR STRAIGHT BAR KNITTING MACHINES
Filed Feb. 15, 1928
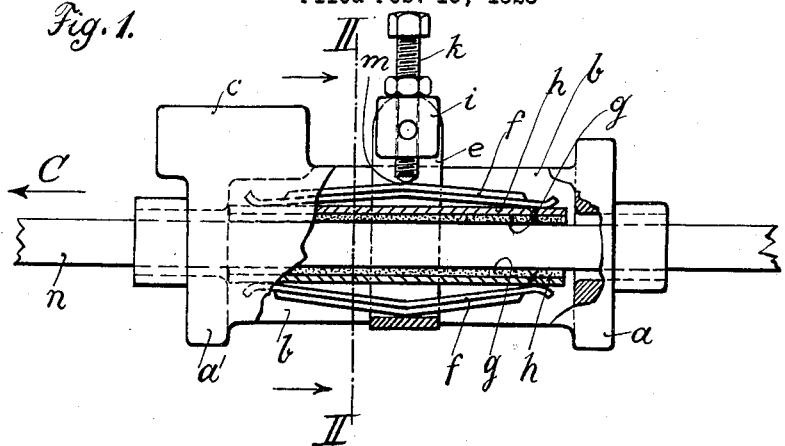
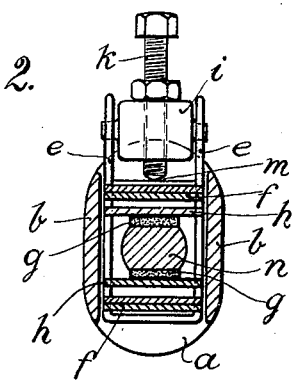
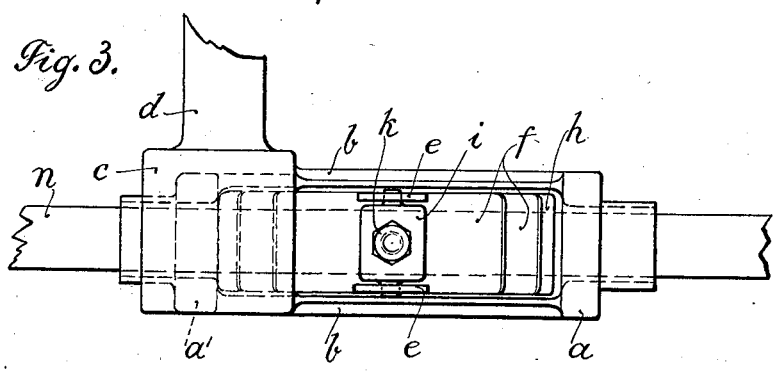
Inventor:
Paul Lieberknecht Patented May 28, 1929.

1,715,338

UNITED STATES PATENT OFFICE.

PAUL LIEBERKNECHT, OF CHEMNITZ, GERMANY, ASSIGNOR TO MASCHINENFABRIK EINSIEDEL GESELLSCHAFT M. B. H., OF EINSIEDEL, NEAR CHEMNITZ, GERMANY.

THREAD-GUIDE-OPERATING DEVICE FOR STRAIGHT-BAR KNITTING MACHINES.

Application filed February 15, 1928, Serial No. 254,526, and in Germany May 2, 1927.

The thread-guides of straight-bar knitting machines are usually operated by means of a driving pin connected to a frame which is threaded on an operating rod and engaged frictionally with the latter. The friction is obtained by means of plates which bear against the rod by leather or like linings and which are clamped to the same by means of leaf springs and a clamping shackle fitted with a screw which bears against the arched back of one of the springs. The shackle is guided in the frame at right angles to the rod, and the friction elements must, owing to constructional reasons, have a certain amount of free play within the frame. When the rod is actuated, its movement is transmitted through the friction plates and through the shackle to the frame and to the driving pin. On the arrival of the thread-guide at the end of the travel, a shock is produced which reacts on the frame and which, if the frictional elements have not, by a displacement relative to the clamp, been brought into contact with the frame, is liable to cause a recoil of the thread-guides and a detrimental displacement of the same relative to the needles.

The object of the present invention is to eliminate this defect, and the invention consists in arranging the clamp loosely within the frame so that it can move independently of the latter. Thus the movement will be transmitted direct by the friction elements to the frame, and the thread-guide will be effectively supported at the end of the travel and prevented from detrimental displacement.

Fig. 1 of the accompanying drawing represents a side view of the improved thread-guide operating device, partly in section, Fig. 2, a cross-section of the same on the line II—II of Fig. 1, and Fig. 3, a top view of the device.

The thread-guide of a knitting machine is operated by means of driving pin $d$ (Fig. 3) which is carried by the head $e$ of a frame which is loosely threaded by means of its end members $a$ and $a'$ on the longitudinally movable operating rod $n$. Between the side members $b$ of the frame two sets of friction elements are arranged which bear against the rod $n$ from opposite sides. Each set is composed of a plate $h$ which bears against the rod $n$ by means of a leather or like lining $g$ and which is held against the rod $n$ by arched leaf springs $f$. A U-shaped shackle $c$, which is loosely guided between the frame members $b$, embraces the springs and the plates and engages in notches made in the edges of the same so as to hold them in position. A block $i$, which is pivotally held between the shackle members, carries an adjusting screw $k$ which bears at $m$ against the pointed back of the adjacent spring $f$ and clamps the friction elements to the rod $n$ with a pressure which can be regulated according to requirements.

If the rod $n$ moves, say in the direction C, the friction elements and the clamp will at once be displaced within the frame, the latter and the thread-guide being carried along by the engagement of the friction plates $h$ with the end member $a'$ of the frame. This engagement of the plates with the frame member will prevent the thread-guide from recoiling at the end of the travel.

I claim:

A thread guide operating device for straight-bar knitting machines, comprising a longitudinally movable operating rod, a pair of plates bearing by means of friction elements against said rod, leaf springs bearing against said plates, a shackle embracing said plates and springs and controlling their relative positions by engagement with notches in the edges thereof, an adjusting screw fitted in the shackle and adapted to cooperate therewith for clamping the plates to the rod through the medium of the springs, and a frame provided with a driving pin threaded loosely on the rod and adapted to be engaged by and receive motion from said plates.

PAUL LIEBERKNECHT.